United States Patent
Glania et al.

(10) Patent No.: US 7,519,614 B2
(45) Date of Patent: Apr. 14, 2009

(54) DATA VERIFICATION SYSTEMS AND METHODS USING BUSINESS OBJECTS

(75) Inventors: Christoph W. Glania, Muehlhausen-Rettigheim (DE); Thomas G. Wieczorek, Meckesheim (DE); Stefan A. Baeuerle, Malsh (DE); Robert Getzner, Heidelberg (DE); Mario A. Mueller, Muehlhausen (DE); Till Oppert, Worms (DE); Peter W. Engel, Maikammer (DE)

(73) Assignee: SAP AG, Walldorf (DE)

( * ) Notice: Subject to any disclaimer, the term of this patent is extended or adjusted under 35 U.S.C. 154(b) by 210 days.

(21) Appl. No.: 11/513,113

(22) Filed: Aug. 31, 2006

(65) Prior Publication Data

US 2008/0059517 A1 Mar. 6, 2008

(51) Int. Cl.
*G06F 17/30* (2006.01)
(52) U.S. Cl. .................. 707/103 Y; 707/9; 707/100
(58) Field of Classification Search ............ 707/1, 707/100–103, 200–204, 9, 10, 103 R–103 Z; 709/203
See application file for complete search history.

(56) References Cited

U.S. PATENT DOCUMENTS

| | | | |
|---|---|---|---|
| 6,457,066 B1 | 9/2002 | Mein et al. | 719/330 |
| 6,898,618 B1 | 5/2005 | Slaughter et al. | 709/203 |
| 7,343,364 B2 * | 3/2008 | Bram et al. | 706/47 |
| 2003/0158961 A1 | 8/2003 | Nomura et al. | 709/237 |
| 2004/0006401 A1 | 1/2004 | Yamada et al. | 700/83 |
| 2004/0044776 A1 | 3/2004 | Larkin | 709/228 |
| 2004/0210445 A1 * | 10/2004 | Veronese et al. | 705/1 |
| 2005/0216282 A1 * | 9/2005 | Chen et al. | 705/1 |
| 2006/0218405 A1 * | 9/2006 | Ama et al. | 713/181 |
| 2007/0033088 A1 * | 2/2007 | Aigner et al. | 705/9 |
| 2007/0180075 A1 * | 8/2007 | Chasman et al. | 709/223 |
| 2007/0288891 A1 * | 12/2007 | Aakolk et al. | 717/114 |

OTHER PUBLICATIONS

Box et al., Simple Object Access Protocol 1.1, May 2000, World Wide Web Consortium.
Harold, Processing XML with Java by Harold, 2002, Chap. 2-3.
Monson-Haefel, Using SOAP with J2EE, Feb. 6, 2004, informIT, pp. 1-23.
Englander, Java and SOAP, May 2002, O'Reilly, Chap. 1,2,4,5.
World Wide Web Consortium, SOAP Version 1.2 Part 0: Primer W3C Recommendation, Jun. 24, 2003, World Wide Web Consortium.
World Wide Web Consortium, SOAP Version 1.2 Part 1: Messaging Framework W3C Recommendation, Jun. 24, 2003, World Wide Web Consortium.

(Continued)

*Primary Examiner*—Cheryl Lewis
(74) *Attorney, Agent, or Firm*—Finnegan, Henderson, Farabow, Garrett & Dunner LLP

(57) ABSTRACT

Embodiments consistent with the present invention relate to methods and systems for verifying data of an application system. Consistent with exemplary embodiments, the method may generate a first business object and generate a second business object from the data related to the first business object. The method may then access metadata defining content included in the first and second business objects. The method may then verify a consistency of data in the first and second business objects according to a comparison of the first and second business objects based on the accessed metadata.

22 Claims, 10 Drawing Sheets

OTHER PUBLICATIONS

Sommers, Why use SOAP?, Mar. 17, 2003, www.artima.com, pp. 1-9.

EGEE, SOAP Simple Object Access Prorocol, May 17, 2004, EGEE, pp. 1-20.

* cited by examiner

DATA VERIFICATION SYSTEMS AND METHODS USING BUSINESS OBJECTS

FIELD

The present invention generally relates to the field of verifying data in a software application system. More particularly, the invention relates to methods and systems for verifying data that may be copied or replicated in a software application system for use in other parts of the system.

BACKGROUND

For IT organizations to enable business agility, they must ensure that enterprise applications are not only high-performance business engines driving efficiencies, but also that they become flexible building blocks of future business systems. One exemplary solution to achieve this goal is the use of a Service Oriented Architecture (SOA). SOA refers to a software architectural framework that may use loosely coupled or decoupled services that communicate and pass information between applications, modules, or components within the framework. For example, the SOA may include decoupled processing components or even deployment units, which may consist of one or more processing components. One implementation example of an SOA is the Enterprise SOA developed by SAP AG of Walldorf, Germany. In particular, the ESA is implemented through SAP NetWeaver, an integration and application platform, also developed by SAP AG. Other examples of SOA enabling platforms are .NET developed by Microsoft and Web Sphere developed by IBM.

A service of an SOA may represent a self-contained, self-describing piece of application functionality that can be found and accessed by other applications. A service may be self-contained, because the application using the service does not have to depend on anything other than the service itself, and may be self-describing, because all of the information on how to use the service can be obtained from the service itself. The descriptions may be centrally stored and accessible through standard mechanisms to all applications that would like to invoke the service. Because services may be generally granular in nature, services may be aggregated, and thus form building blocks for the task of automating enterprise-scale business scenarios.

Invoking a service typically involves the service's interaction and manipulation of data, specifically data in the form of business objects, stored within a repository or database. The term business object when used in an SOA represents a physical or logical object, such as a sales order. The description and creation of a business object may be accomplished through the use of metadata. Metadata, in general terms, may be described as data that describes other data.

Within an SOA, deployment units may contain business objects that process data. Further, each deployment unit may process data that is copied and sent from another deployment unit. For example, an SOA business application may manage inventory data. The application may have a first deployment unit for handling sales order data and a second deployment unit for handling accounting data based on the sales order data provided by the first deployment unit. As described above, in an SOA and other types of frameworks, the two deployment units may be decoupled. For instance, as discussed, the first deployment unit may continue processing after sending data for receipt by the second deployment unit, independently of whether or not the second deployment unit successfully received the sent data.

As noted above, the sent data may be based on data copied by the first deployment unit. In some situations, the sending deployment unit may not know if the message was ever received or whether the receiving deployment unit processed it correctly. The data sent by the first deployment unit, therefore, may not be consistent with any data received by the second deployment unit, if it was received at all. This data inconsistency, in turn, may compromise the accuracy or integrity of the data handled by the second deployment unit. In an inventory management system, such data inconsistencies can cause numerous problems, ranging from distorting perceived inventory levels to creating errors on reported financial information. Ensuring the consistency of the data operated on or output by each deployment unit is thus extremely important.

Verifying the consistency of data is also important for software application systems other than one implemented in an SOA. In particular, many types of software applications may copy data to create data for use in other parts of the application. This may occur, for example, in legacy systems, stand-alone applications, etc. When the data is copied in such systems, errors may be introduced as part of the process performing the data copying. Accordingly, there is thus a need for a way to ensure the consistency of data that is copied in a software application system for use by other parts of the system.

SUMMARY

Embodiments consistent with the present invention relate to methods and systems for verifying data of an application system. Consistent with exemplary embodiments, the method may generate a first business object and generate a second business object from the data related to the first business object. The method may then access metadata defining content included in the first and second business objects. The method may then verify a consistency of data in the first and second business objects according to a comparison of the first and second business objects based on the accessed metadata.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DETAILED DESCRIPTION

Figure 1:
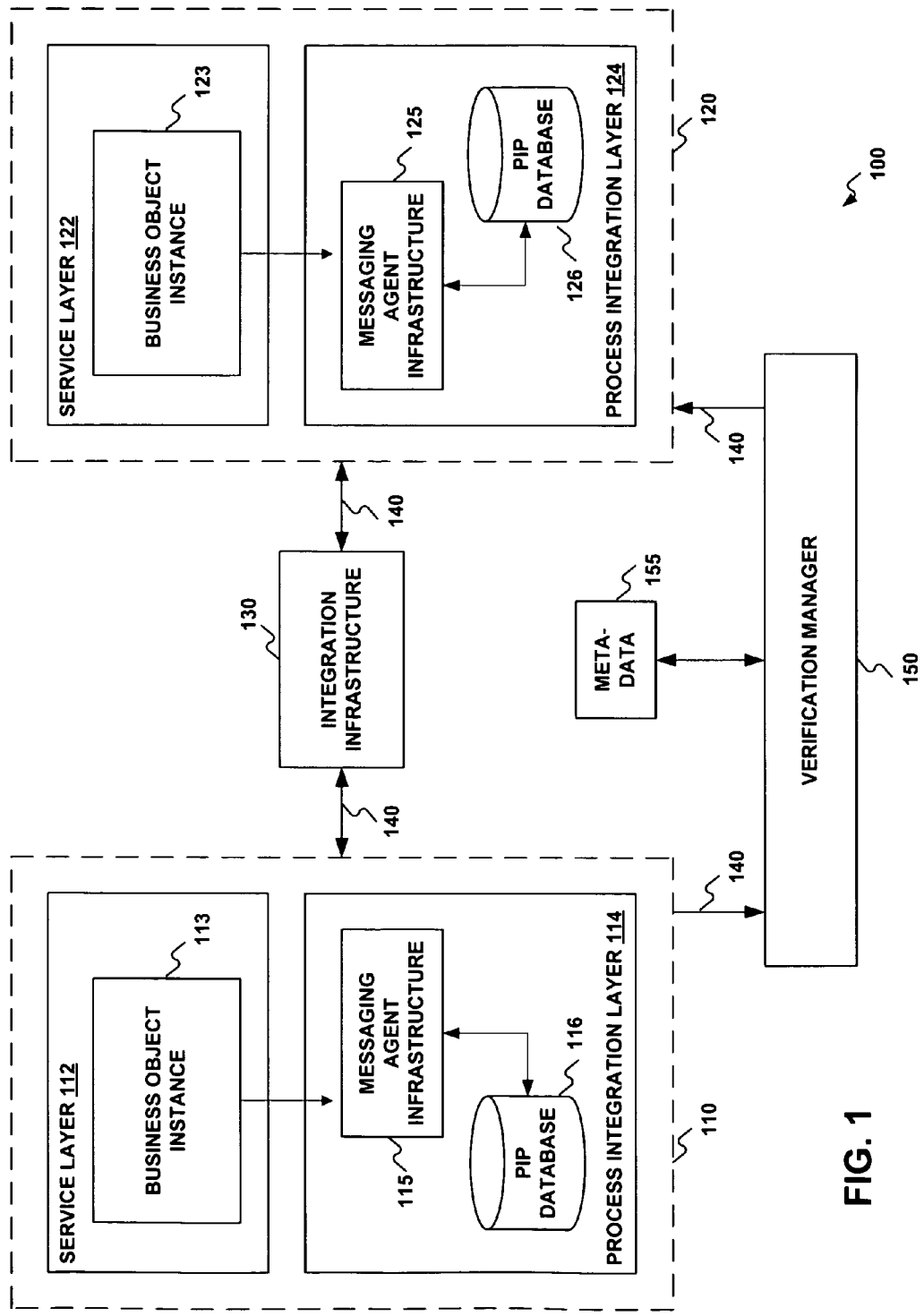
FIG. 1 illustrates an exemplary environment of a system 100 consistent with the present invention.

The following description refers to the accompanying drawings. Wherever possible, the same reference numbers will be used throughout the drawings to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Systems and methods consistent with the present invention may be used to verify data consistency between any part of a system environment. While data verification systems and methods consistent with the invention are described below with respect to verifying data between deployment units, the description of deployment units is entirely exemplary. Exemplary embodiments may, for example, be used to verify data between any type parts of a software application system. Further, systems consistent with the invention may be used to verify data that the system may copy for use in another part of the system.

In exemplary embodiments, a verification manager may thus be implemented to select for comparison data sent between, for example, deployment units. The data selected from one deployment unit may be based on data copied from the other deployment unit. Upon comparing the selected data, the verification manager may then implement a reconciliation procedure for any data detected to be inconsistent. For example, the reconciliation procedure may involve resending the particular data between the deployment units. Further, the data selected by the verification manager may be any type of data reflecting an inconsistency. In exemplary embodiments, systems consistent with the invention may verify business data included in a business object sent between deployment units. In other exemplary embodiments, the system may also verify messaging data that may be associated with a sent business object and retained by a sending or receiving deployment unit. Systems consistent with the invention are not limited to verifying business object data, however, and may be used to verify any type of copied data within a software application system.

FIG. 1 illustrates a block diagram of a data verification system 100 consistent with the present invention. As shown in FIG. 1, system 100 may include deployment units 110 and 120, which may communicate with each other via an integration infrastructure 130 over network connections 140. System 100 may also include a verification manager 150, which may also communicate with deployment units 110 and 120 via network connections 140. While FIG. 1 shows only two deployment units 110 and 120, systems consistent with the invention may include any number of deployment units. Moreover, the components of FIG. 1 may be distributed at a single location or among multiple locations. Further, while system 100 may be implemented as part of a services oriented architecture (SOA), other types of frameworks or systems that process copied data may be used.

Deployment units 110 and 120 may include one or more processors, such as computers, to interface with other computers, such as other deployment units or integration infrastructure 130. In the exemplary embodiment of FIG. 1, deployment unit 110 may send a business object for receipt by deployment unit 120. Accordingly, deployment unit 110 is illustrated as having "outbound" components, while deployment unit 120 is illustrated as having "inbound" components. However, the designations of "outbound" and "inbound" are for purposes of illustration only, and either deployment unit may perform outbound and inbound functions. Finally, persons of ordinary skill in the art will recognize that the use of deployment units 110 and 120 are exemplary and that system 100 may communicate data between other constituent parts of system 100, such as individual processing components that forming parts of one or more deployment units.

As shown in FIG. 1, deployment unit 110 may further include a service layer 112 and a process integration layer 114. Service layer 112 may be used to implement an interface layer through which a user may view, process, or manipulate a business object, such as business object instance 113. As noted above, business object 113 may represent any physical or logical object. For example, business object 113 may represent a sales order that is processed by deployment unit 110. As discussed above, deployment unit 110 may copy data of business object instance 113 when sending that data to deployment unit 120 for processing. Finally, while FIG. 1 illustrates only one business object 113, this is for purposes of illustration only and deployment units consistent with the invention may handle any number of business objects.

Process integration layer 114 may implement functionality known in the art for sending business objects for receipt by another deployment unit, such as deployment unit 120, via integration infrastructure 130. As shown in FIG. 1, process integration layer 114 may further include a messaging agent infrastructure (MAI) 115 and a process integration persistence (PIP) database 116.

MAI 115 may receive and manage notifications about business object instances 113 stored by a user. MAI 115 may, for example, determine that a saved version of a business object 113 needs to be sent to another deployment unit. In such a case, MAI 115 may send data copied from business object 113 as part of, for example, a message sent to the other deployment unit (e.g., deployment unit 120).

PIP database 116 may store data about messages sent by process integration layer 114 of deployment unit 110. In one exemplary embodiment, PIP database 116 may store data relating to data of business object instances 113 included in a message sent by deployment unit 110, but not the business data itself of instance 113. More particularly, PIP database 116 may store a message history for each business object 113 processed by deployment unit 110, including tracking which deployment unit (or processing component, etc.) the business object was sent to, what type of message was sent (e.g., a message containing a new business object, a message modifying or updating a previously sent business object, etc.), etc. PIP database 116 may also store for each message, data reflecting the business object instance's ID, the business object instance's type, the IDs of the business object instance's root nodes, etc. The above data is exemplary, however, and PIP database 116 may store any type of data relating to messages sent by deployment unit 110.

Integration infrastructure 130 may receive a sent message and route the message to an appropriate deployment unit via network connections 140. In exemplary embodiments, integration server 130 may determine which deployment unit is to receive a sent message. In other arrangements, however, the deployment units themselves may determine which other deployment unit is to receive a message, and integration infrastructure 130 may simply routes the message to the inbound deployment unit. In any event, the structure and operation of integration infrastructure 130 is well known to those of ordinary skill in the art and will thus not be described in detail here.

Network connections 140 may include, alone or in any suitable combination, a telephony-based network, a local area network (LAN), a wide area network (WAN), a dedicated intranet, wireless LAN, the Internet, a wireless network, a bus, or any other communication mechanism. Further, any suitable combination of wired and/or wireless components and systems may implement network connections 140. Moreover, connections 140 may be embodied using bi-directional, unidirectional, or dedicated communication links. Network connections 140 may also implement standard transmission protocols, such as Transmission Control Protocol/Internet Protocol (TCP/IP), Hyper Text Transfer Protocol (HTTP), Simple Object Access Protocol (SOAP), Remote Procedure Call (RPC), or other protocols.

Verification manager 150 may communicate, via network connections 140, with each of deployment units 110 and 120. More specifically, verification manager 150 may verify the consistency of data sent between deployment units 110 and 120, data within a deployment unit itself, or data within other parts of system 100. In exemplary embodiments, verification manager 150 may select data of deployment units 110 and 120 to compare, compare that data, and, if an inconsistency is detected, implement reconciliation procedures to correct for any data inconsistencies.

Further, while FIG. 1 illustrates one verification manager 150 communicating with both of deployment units 110 and 120, other exemplary embodiments may include a verification manager associated with each deployment unit. In such embodiments, each verification manager may select data associated with its respective deployment unit for either sending to another deployment unit for verification or for verifying against data selected by a verification manager of another deployment unit.

Exemplary embodiments of the invention may use metadata 155 as part of a data verification process. Metadata 155 may, for example, include structural and functional data about business objects 113, as described in more detail below with respect to FIG. 2. While FIG. 1 illustrates metadata 155 as separate from the other components of system 100, metadata 155 may be, for example, stored in a database associated with verification manager 150. Metadata 155 may though reside on a central repository (not shown) accessible to system 100, as well as at other locations of system 100.

Deployment unit 120 includes components paralleling those of deployment unit 110. In particular, as shown in FIG. 1, deployment unit 120 may further include a service layer 122, a business object instance 123, a process integration layer 124, an MAI 125, and a PIP database 126. These components operate similarly to the like components of deployment unit 110, except that they are illustrated as performing inbound functions for receiving a sent message. Business object instance 123 may be generated from a message from deployment unit 110 including data of business object instance 113. In exemplary arrangements, business object instance 123 is a physical or logical object different than that of business object instance 113, but based on the data included (in whole or in part) in business object instance 113. For example, as described above, deployment units 110 and 120 may each be responsible for performing particular tasks or services. Deployment unit 110 may process a business object 113 reflecting a sales order, while business object 123 in deployment unit 120 may reflect an accounting notification based on the particular sales order.

Business objects 113 and 123 processed by deployment units 110 and 120, respectively, may be associated with metadata 155. Metadata, in general terms, may be defined as data about data. For example, metadata may refer to information about the data itself, such as content, origin, size, formatting, characteristics of data, and the like. Metadata may include a schema. A schema may reflect the organization or structure, such as the organization of a database or the structure of an object in an object oriented program. In object oriented programming, modeling (i.e., the analysis of objects that are used in a business or other context and the identification of the relationships among these data objects) leads to a schema. The schema can be depicted visually as a structure or a formal text-oriented description (e.g., script). For example, metadata may be in the form of database tables. The metadata may include information such as the number of nodes in a business object, the name(s) of the nodes, the position of a node in the business object hierarchy (e.g., a root node or a sub-node), the structure of a node, associations, actions, and default queries on a node.

Figure 2:
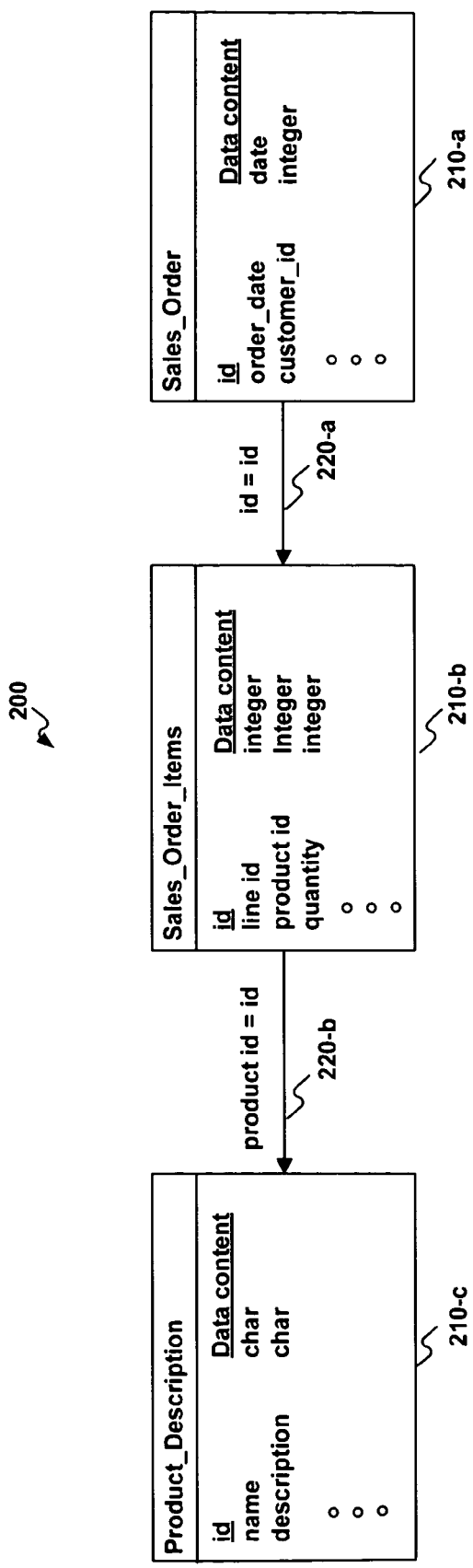
FIG. 2 illustrates an example of metadata for a business object.

FIG. 2 illustrates an example of metadata 116 for a business object 113. As illustrated, business object 113 represents a sales order 200. The schema includes a business object root node for a sales order 210-a, a sub-node for sales order items 210-b included in sales order 210-a, and a sub-node for the corresponding product description 210-c. Moreover, the schema depicted in FIG. 2 may include keys 220 that identify the relationships among the business object nodes 210. For example, key 220-a is a sales order identification value ("id") that is used to link business object root node 210-a to sub-node 210-b. Key 220-b links the product identification values (labeled in FIG. 2 as "product id") of sales order items 210-b to product identification values (labeled "id") of product descriptions 210-c. Persons skilled in the art will understand that the use of keys is entirely exemplary, however, and that other means for defining the relations between business object nodes may be used. For example, an association (e.g., compositions and aggregations) can define these relations. Furthermore, such relations can also be defined not just between nodes of the same business objects, but also between nodes of different business objects. The schema, which depicts business object nodes 210 and how they are associated or related to one another, may be considered metadata. Moreover, the schema may be considered a "model" of how to implement these business object nodes 210. As explained in more detail below, the model may serve as a template for selecting and/or comparing the relevant parts of business object data for identifying inconsistencies between data of deployment units 110 and 120.

Using a software application capable of performing the function of supply chain management as a non-limiting example of system 100, an exemplary operation is described.

A function of the supply chain management application may include the creation of a sales order and in turn, this functionality is implemented by service layer 112. In order for service layer 112 to perform this function, deployment unit 110 may instantiate a business object instance 113 reflecting a sales order. As used herein, the term "instantiate" may mean, in an object-oriented programming environment, deploying, customizing, running, and/or executing an application, function, or object. The term "instance," on the other hand, may mean one or more copies of an application, function, or object that has been instantiated.

If business object instance 113 is saved, process integration layer 114 may then determine whether data of instance 113 is to be sent to another deployment unit for processing. For example, system 100 may need to generate an accounting notification based on the number of items sold by the sales order. MAI 115, alone or in combination with integration server 130, may thus determine to send a message containing copied data of instance 113 to deployment unit 120. PIP database 116 may then, as described above, store data identifying any message sent by deployment unit 110. Upon receipt of the message by deployment unit 120, deployment unit 120 may generate, update, or delete a business object instance 123 reflecting the accounting notification based on the copied data included in the message. PIP database 126 may then store data identifying the message received by deployment unit 120. Other processing by deployment unit 120, as noted above, may parallel that of deployment unit 110.

Figure 3:
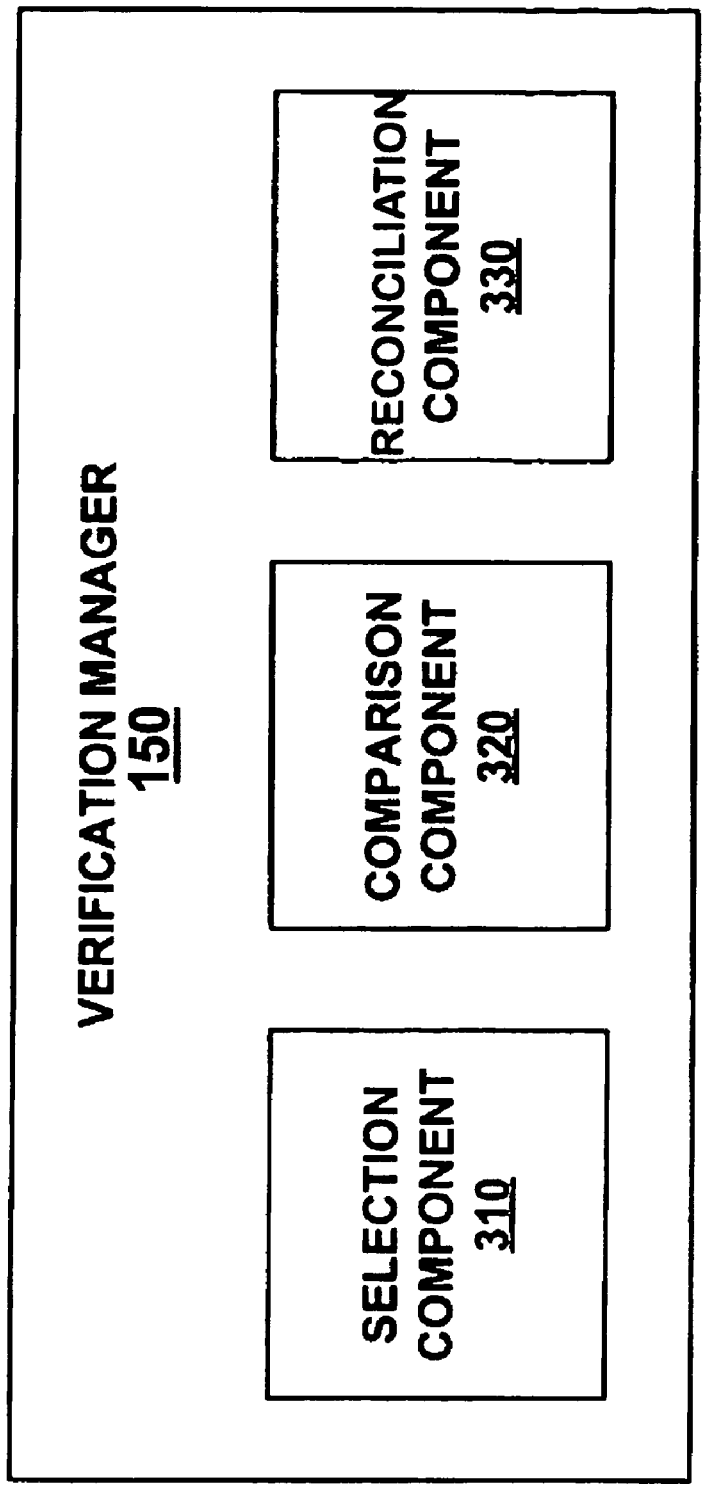
FIG. 3 illustrates a conceptual block diagram of an exemplary embodiment of a verification manager consistent with the present invention.

FIG. 3 illustrates a conceptual block diagram of an exemplary embodiment of verification manager 150. As shown in FIG. 3, verification manager may further include a selection component 310, a comparison component 320, and a reconciliation component 330. While FIG. 3 illustrates components 310, 320, and 330 as separate components, verification managers 150 consistent with the invention may implement these components using other arrangements, such as a single component capable of performing the functions of each of components 310, 320, and 330. Moreover, the functionality of components 310, 320, and 330 need not be performed at a single location, but may be distributed among the various components of system 100. Further, verification manager 150 may also include user interface components (not shown) allowing for a user to view data processed by manager 150 or to implement any of the functions of manager 150 described herein.

Selection component 310 may select data of deployment unit 110 and/or deployment unit 120 to check for consistency. Component 310 may, for example, select a pair of business object instances from an sending deployment unit and a receiving deployment unit (e.g., the pair of business object instances 113 and 123 or a pair of business objects within one deployment unit). In situations where a sending deployment unit may send more than one business object to a particular deployment unit, selection component 310 may select the cluster of business objects sent from the sending deployment unit and select the corresponding cluster of business objects received by the receiving deployment unit.

Selection component 310 may also select other data from one or both of deployment units 110 and 120 to verify data consistency. For example, as described in greater detail below, selection component 310 may also select the messaging data from PIP database 116 and/or PIP database 126 corresponding to one or more sent messages including business object data.

Selection module 310 may also allow a user to select data for verification based on a selected time interval. For example, the time interval may be based on a date associated with, for example, business object 113, 123 themselves, such as the time the business object was created or last modified. The time interval may also be based on a date included in PIP databases 116, 126 specifying when data of a business object was last sent. In exemplary embodiments, selection component 310 may automatically verify the data at scheduled times or may initiate a verification upon manual selection by a user.

When asynchronous communication is used between deployment units 110 and 120, applying the selected time interval to both the inbound and outbound side may not capture the corresponding outbound-inbound pairs since the time a message was sent may not correlate to when it was received. This may thus cause, in some cases, an "over-detection" of inconsistencies when none exist. Systems 100 consistent with the invention, may though avoid any over-detection by combining a time interval selection with a repeat check (described below) of any detected inconsistencies. For example, the repeat check may involve selection component 310 selecting data based on keys or references of a business object, as opposed to the time interval. Because a key will not be influenced by the uncorrelated sent and received times, it may avoid any "over-detection" situations.

Selection component 310 may also use metadata 155 to select data for comparison. For example, selection component 310 may be programmed to select predetermined data types of business objects 113 and 123 for comparison. Business objects 113 and 123, for instance, may have corresponding data but have a different structure that storing the data in different data fields. Selection component 310 may thus use metadata 155 to identify and select that data from the respective data fields of business objects 113 and 123. In this way, selection component 310 may efficiently and easily be extended to compare different types of business objects (including fields within business objects) based on the use of metadata 155. Comparison component 320 may then compare the data selected by selection component 310. When comparing data of business objects 113 and 123, comparison component 320 also may utilize metadata 155 in comparing corresponding data fields of business objects 113 and 123.

In performing a comparison, comparison component 320 may use a variety of techniques known to those of ordinary skill in the art for comparing data. For example, component 320 may simply compare data on an item-by-item basis and identify in a log any differences. As an addition example, component 320 may use a checksum approach for comparing data, where a checksum is calculated of the selected data from the sending deployment unit and a checksum is calculated of the data from the receiving deployment unit. In such exemplary embodiments, component 320 may then compare the calculated checksums to identify an data inconsistencies. Comparison component 320 may compute the checksum using checksum techniques known to those skilled in the art.

Reconciliation component 330 may implement any reconciliation procedures to correct or verify any data inconsistencies detected by verification manager 150. As described in more detail below, component 330 may, for example, institute a repeat data check to verify any data inconsistencies or institute a procedure to reconcile or correct any data inconsistencies.

Further, as noted above, exemplary embodiments may include a verification manager associated with each deployment unit. In such embodiments, for example, a verification manager associated with deployment unit 110 may select data associated with business object 113 and a verification manager associated with deployment unit 120 may select data associated with business object 123. Either verification manager may then receive the data selected by the other verification manager and perform the comparison and reconciliation operations with respect to the data selected from both business objects.

Figure 4:
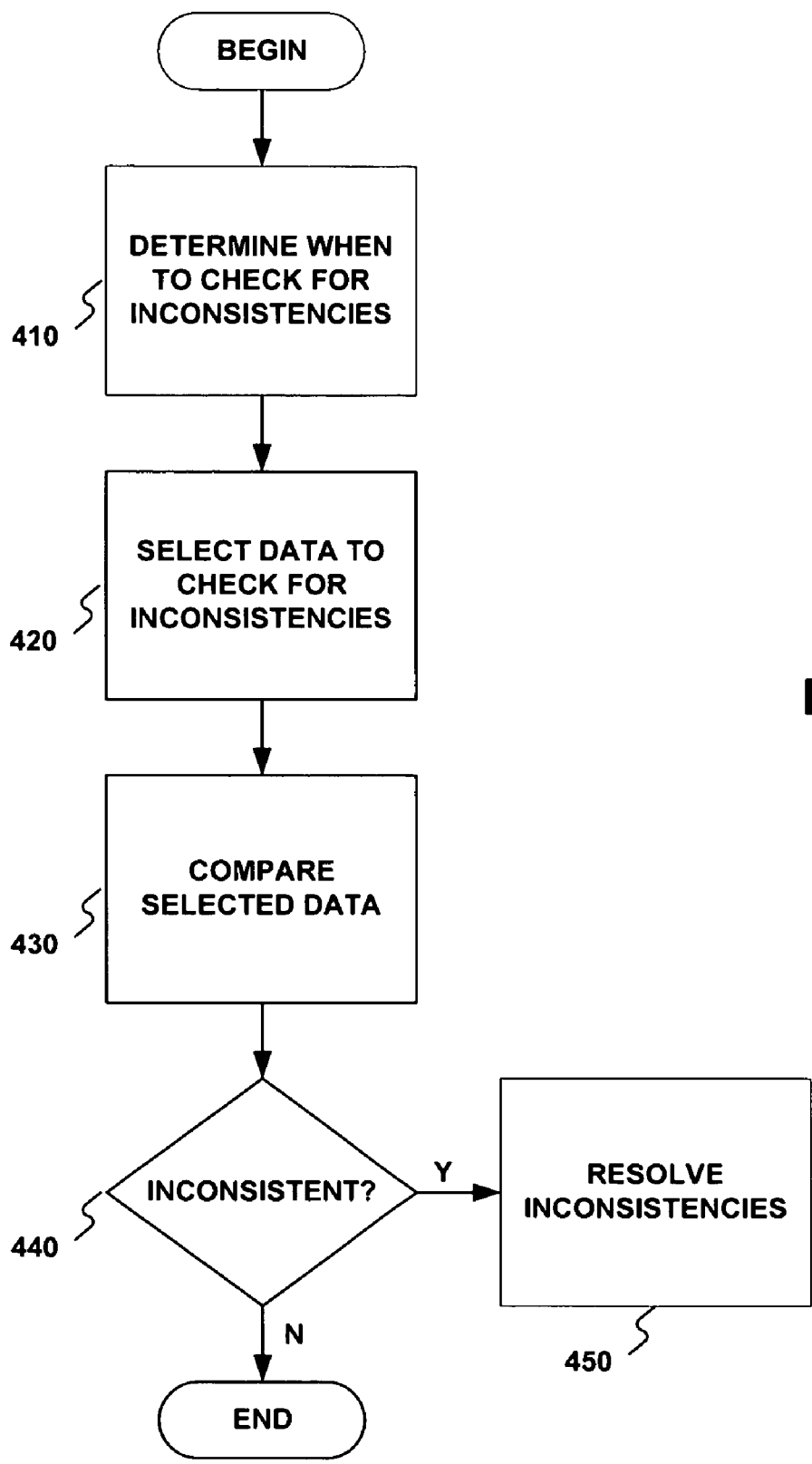
FIG. 4 illustrates a flow diagram of an exemplary embodiment for a data verification process consistent with the present invention.

FIG. 4 illustrates a flow diagram of an exemplary embodiment for a data verification process consistent with the present invention. Systems consistent with the invention may implement a data verification process at any time and, thus, need not be part of an actual data communication process. As shown in FIG. 4, the process may begin by verification manager 150 determining when to perform a verification process (stage 410). For instance, verification manager 150 may perform a verification check at either selected times chosen manually by a user or may automatically verify data at scheduled times. Further, verification manager 150 may also allow a user to select for analysis messages or data sent or modified during a particular time frame. Verification manager 150 may use other selection criteria, however. Indeed, while stage 410 may refer to determining when to perform a verification process, systems 100 consistent with the invention may allow a user to define the scope of the verification process in other ways, such as verifying only certain types of messages, etc.

Selection component 310 may then select data for data from deployment unit 110 and/or deployment unit 120 to verify (stage 420). Systems consistent with the invention may select any type of data from one or more deployment units that may indicate possible inconsistent data in system 100. For example, selection component 310 may select data sent by deployment unit 110 and the corresponding data received by deployment unit 120 so that verification manager 150 may verify that the data is consistent. In other embodiments, selection component 310 may select data from only deployment unit 110 to verify that it correctly performed its sending functions. Selection component 310 may, however, select any data of system 100 that may reflect an inconsistency of copied data. Exemplary selection operations are described in greater detail below with respect to FIGS. 5A, 5B, and 5C.

Comparison component 320 may then compare the data selected by selection component 310 (stage 430). As noted above, comparison component 320 may compare data by using any type of comparison techniques, such as by comparing data on an item-by-item basis. Comparison component 310 may then output the results of the comparison to, for example, a file, database, log, or business object. For example, the file may be a log file that identifies any differences or inconsistencies in the data detected by the comparison operation. Exemplary comparison operations are described in greater detail below with respect to FIGS. 5A, 5B, and 5C.

If verification manager 150 determines that system 100 does not contain any inconsistent data (stage 440; No), then the verification process may end. If, however, verification manager 150 determines that system may contain inconsistent data (stage 440; Yes), then verification manager 150 may provide for measures to resolve or reconcile any such inconsistencies (stage 450). For example, reconciliation component 330 may implement a reconciliation procedure causing data to be resent from deployment unit 110 to deployment unit 120. Exemplary operations for reconciling or resolving any data inconsistencies are described in greater detail below with respect to FIG. 5B.

Figure 5A:
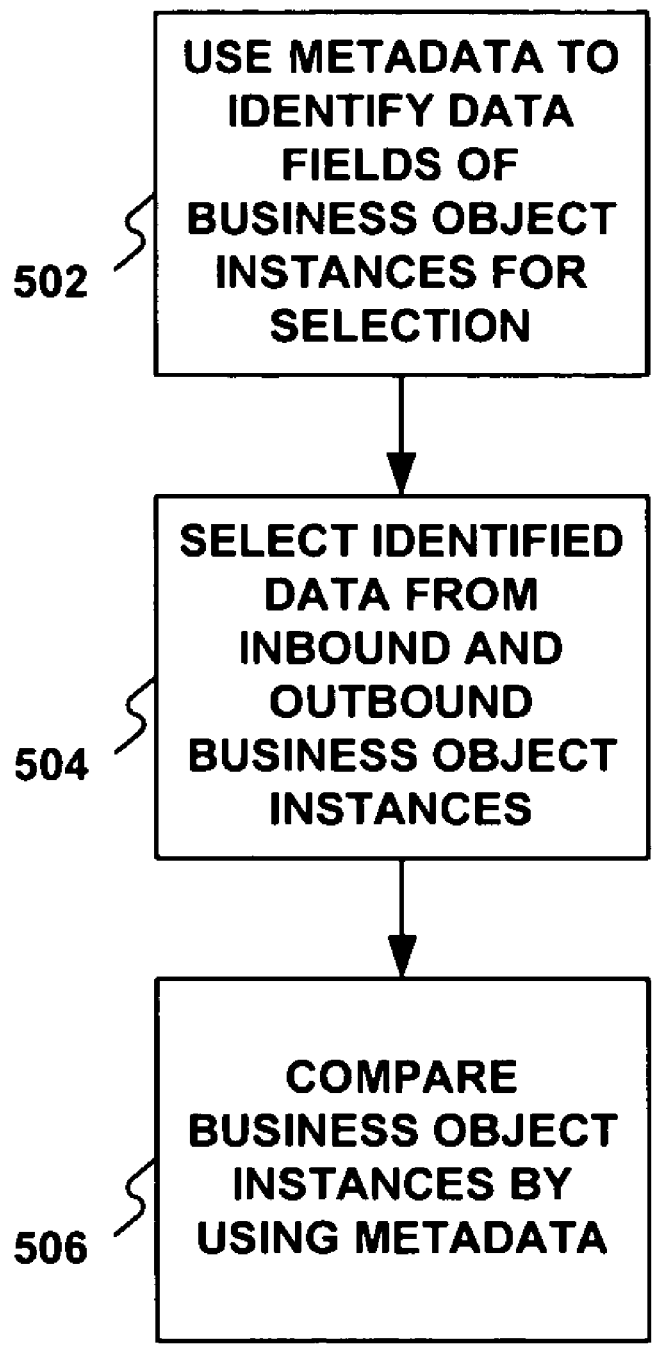
FIG. 5A illustrates a first exemplary embodiment of a data selection and comparison process consistent with the present invention.

FIG. 5A illustrates a first exemplary embodiment of the data selection and comparison operations of FIG. 4. In the embodiment of FIG. 5A, verification manager 150 may verify data of system 100 based on business object instances sent between deployment units. This verification may thus confirm the existence of the respective business objects in each deployment unit as well as the accuracy of the attributes within each business object.

As shown in FIG. 5A, selection component 310 may use metadata 155 to identify data for verification (stage 502). For example, verification manager 150 may use metadata 155 to select the business object pairs or clusters in each deployment unit having copied data that correspond to one another. More specifically, selection component 310 may use metadata 155 to read the business object IDs of each business objects 113 and 123 to identify the corresponding pairs or clusters to be compared. Selection component 310 may also use metadata 155 to identify, as described above, the particular data fields within business objects 113 and 123 that correspond to one another. For example, metadata 116 may identify the particular data fields of business object 123 (e.g., the data fields for the name of a customer) that should contain data copied from business object 113.

Selection component 310 may then select the identified data fields of business objects 113 and 123 (stage 504). For instance, selection component 310 may perform a read of the relevant business object data to provide the read data to comparison component 320. Further, as discussed above, selection component 310 may select a pair of business object instances from a sending (outbound) deployment unit and a receiving (inbound) deployment unit, e.g., business object instances 113 and 123 of FIG. 1. However, in certain applications, selection component 310 may select respective corresponding clusters of business objects from a sending and a receiving deployment unit, such as when a cluster of business objects relate to one another or are sent together to implement a particular function or service.

Comparison component 320 may then compare the corresponding data fields of the selected business object instances (stage 506). Verification manager may output the results of the comparison to a log. The comparison output may be a list of the selected business object instances that are correct and a list the selected business object instances that are not correct.

In exemplary embodiments, comparison component 320 may compare the business object instances by calculating a checksum. For instance, comparison component 320 may calculate a checksum using the data from those data fields of business object 113 corresponding to the data fields of business object 123. Component 320 may then calculate a similar checksum based on the data of the corresponding data fields of business object 123. Comparison component 320 may then compare the calculated checksums to identify any data inconsistencies. If the checksums are the same, then component 320 may determine that the business objects are consistent. If the checksums are not the same, however, then component 320 may determine that the business objects are not consistent.

Verification manager 150 need not though obtain the checksums for both business objects. For example, deployment unit 110 may itself compute a checksum for the selected data of business object 113 and include the checksum with the message sent to deployment unit 120. Deployment unit 120 may the compute a new checksum based on the selected data of the received business object and compare the two checksum.

Figure 5B:
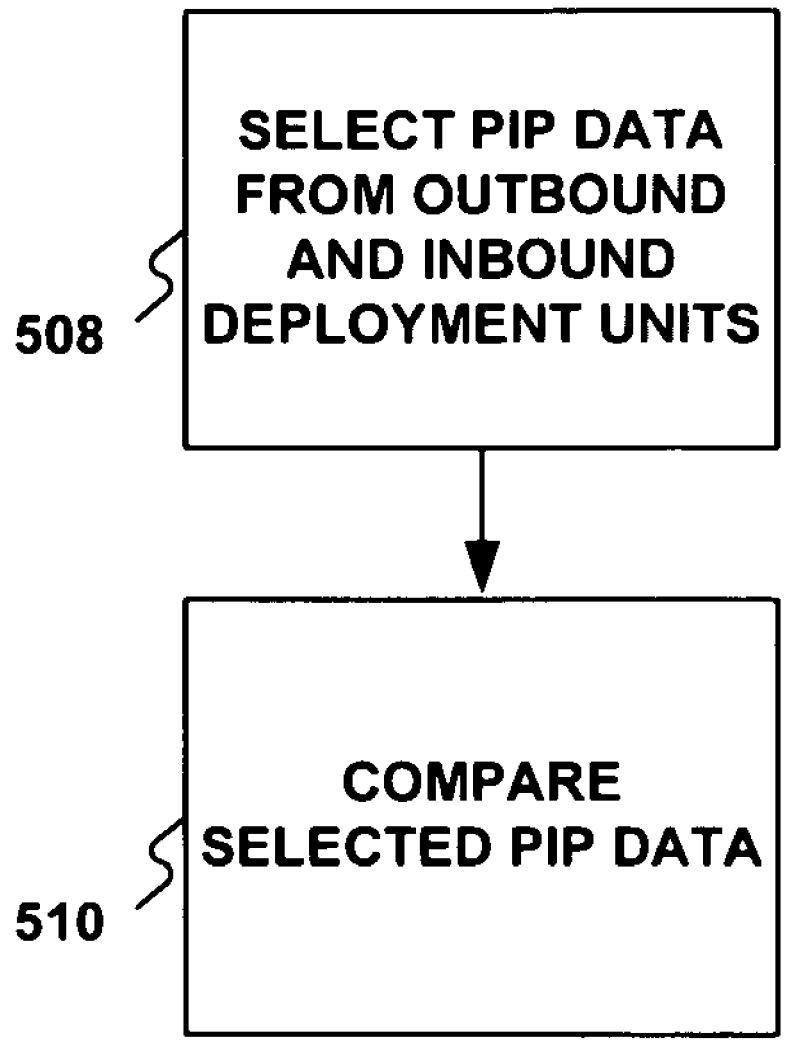
FIG. 5B illustrates a second exemplary embodiment of a data selection and comparison process consistent with the present invention.

FIG. 5B illustrates a second exemplary embodiment of the data selection and comparison operations of FIG. 4. In the embodiment of FIG. 5B, verification manager 150 may verify data of system 100 based on the data of PIP databases 116 and 126.

As shown in FIG. 5B, selection component 310 may thus select the PIP outbound data from PIP database 116 and the PIP inbound data from PIP database 126 (stage 508). As described above, each PIP database may store data identifying business objects sent or received by the respective deployment unit as well as other data associated with particular message transfer operations. Selection component 310 may select the range of data from each PIP database based on a selection criteria, such as messages sent during a predetermined time period, messages sent between particular deployment units, etc.

Comparison component 320 may then compare the data of the PIP outbound and inbound databases 116 and 126 (stage 510). Verification manager 150 may output the results of the comparison to, for example, a file or log. The comparison output may, for example, be a list of the PIP entries in deployment units 110 and 120 that are consistent and a list of those that are inconsistent. For those PIP entries that are not consistent, system 100 may then perform the necessary reconciliation procedures, such as those described below with respect to FIG. 6. Instead of listing the PIP entries, however, alternative embodiments may identify the business objects associated with those PIP entries.

The PIP comparison of FIG. 5B has the advantages of verifying the message communication between deployment units. For instance, the exemplary process of FIG. 5B may be used to identify those messages that were not received by the inbound deployment unit 120. If, for example, PIP database 126 has an entry matching an entry in PIP database 116, then verification manager 150 can determine that the message was successfully received. The PIP comparison of FIG. 5B also has the advantages in that it may be a relatively quick and efficient check since it is based on the messaging information contained in the PIP databases, as opposed to comparing the all of the actual data (messaging data and business data) that may be included in any sent message.

Figure 5C:
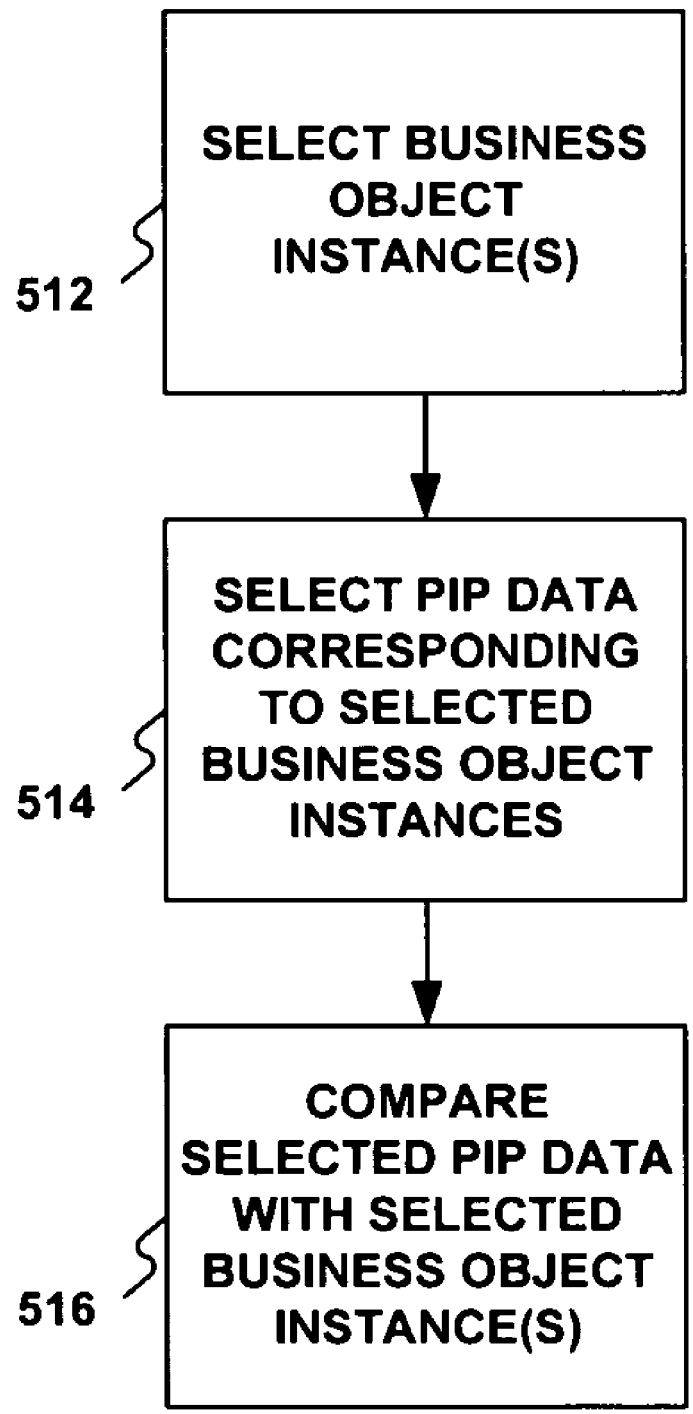
FIG. 5C illustrates a third exemplary embodiment of a data selection and comparison process consistent with the present invention.

FIG. 5C illustrates a third exemplary embodiment of the data selection and comparison operations of FIG. 4. In the embodiment of FIG. 5C, verification manager 150 may verify data of system 100 based on the data of outbound PIP database 116.

The verification process of FIG. 5C may be used to verify the outbound communication process. For instance, as discussed above, deployment units consistent with the invention may be responsible for processing business objects of particular types. When, for example, deployment unit 110 creates a business object instance 113, MAI 115 may determine whether to initiate the sending of a message containing the data of business object instance 113 to another deployment unit, such as deployment unit 120. As discussed above, for each message sent, PIP database 116 may store data reflecting the business object data sent by deployment unit 110. Thus, the data of PIP database 116 may thus reflect, in exemplary embodiments, the determinations made by MAI 115 in determining whether to send the data of a particular business object instance 113.

During the messaging process, however, errors may be introduced such that PIP database 116 contains incorrect data with respect to a particular message. Further, in other situations, a record of a particular message may be entirely missing from PIP database 116. Incorrect or missing data in PIP database 116 may thus, in turn, indicate an inconsistency between the data of deployment unit 110 and deployment unit 120. Accordingly, systems consistent with the invention may analyze the data of PIP database 116 to identify data inconsistencies.

Referring to FIG. 5C, selection component 310 may first select the business object instances 113 stored in deployment unit 110 (stage 512). For example, as described above, selection component 310 may use metadata 155 or other selection criteria made by a user to identify and select particular business objects for verification. Selection component 310 may then select a record of PIP database 116 corresponding to a root node ID of a business object 113 (stage 514). As described above, PIP database 116 may store the node IDs of business objects from which copied data was sent in a message. Selection module 310 may thus use the node IDs in the PIP data to identify the PIP data corresponding to the selected business object instance 113 of deployment unit 110.

Comparison component 320 may then compare the data of PIP database 116 corresponding to business object 113 with the business object 113 itself (stage 516). In this way, systems consistent with the invention may check the processing of MAI 115 to determine that it correctly processed business object 113 in determining whether to send a message containing its data to another deployment unit. If the PIP data is not correct, then the message sent by deployment unit 110 including the data of business object 113 may not have been correct, and the system can perform the necessary reconciliation procedures, such as those described with respect to FIG. 6 below. If the PIP data associated with business object 113 is entirely missing from PIP database 116, then deployment unit 110 never sent the message including the data of business object 113, and, again, the system can perform the necessary reconciliation procedures.

The exemplary procedure of FIG. 5C may be used to efficiently determine whether deployment unit 110 needs to initially transfer data of a business object 113 to another deployment unit. By comparing the outbound business object instances 113 with the PIP data of database 116, verification manager 150 may identify all instances which need to be transferred to the other deployment unit. Further, while FIG. 5C is illustrated as comparing a business object and PIP data from outbound deployment unit 110, the process of FIG. 5C also applies to performing such a comparison of business objects 123 with PIP data of database 126. In such exemplary embodiments, the verification process of FIG. 5C may be used to verify the inbound communication process by deployment unit 120.

Figure 5D:
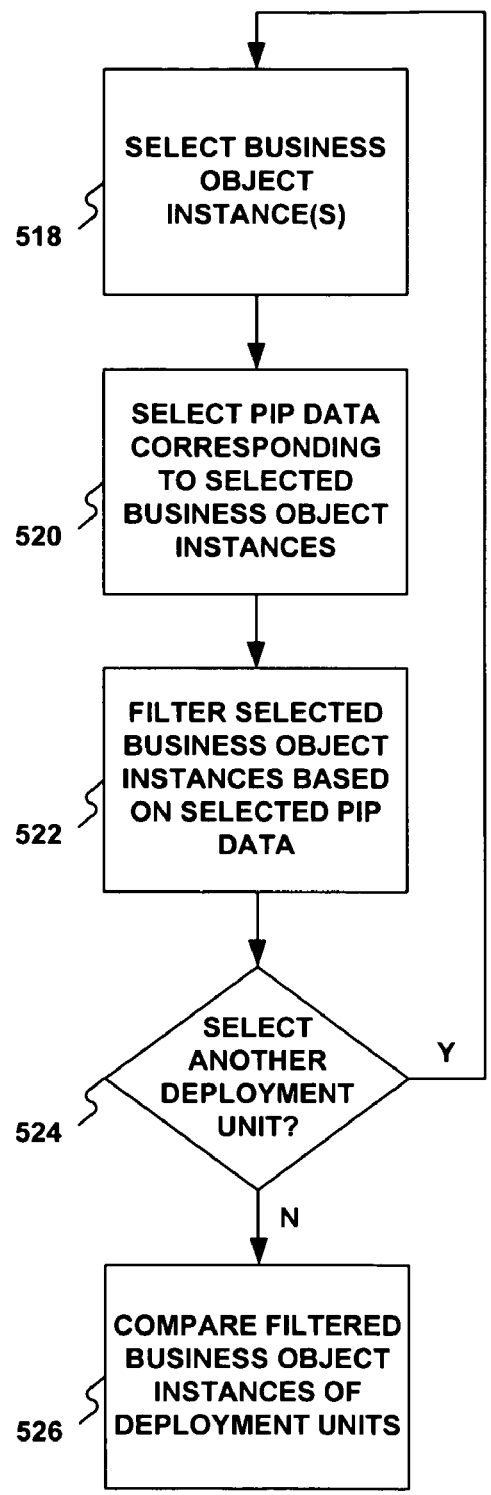
FIG. 5D illustrates a fourth exemplary embodiment of a data selection and comparison process consistent with the present invention.

FIG. 5D illustrates a fourth exemplary embodiment of the data selection and comparison operations of FIG. 4. As shown in FIG. 5D, selection component 310 may first select business object instances 113 stored in deployment unit 110 (stage 518) and then select records of PIP database 116 corresponding to root node IDs of the selected business objects 113 (stage 520). The operation of processing stages 518 and 520 may correspond to stages 512 and 514 described above. Verification manager 150 may then filter the selected business object instances based on the PIP data (stage 522). In particular, verification manager 150 may filter out those business object instances 113 which were not, as indicated by the PIP data, ever sent to another deployment unit and, therefore, for which data verification may not be necessary. Verification manager 150 may then repeat the processing operation of stages 518 to 522 for business object instances 123 of deployment unit 120 (stage 524). Finally, comparison component 320 may then compare the filtered business object instances 113 and 123 (stage 526).

Figure 6:
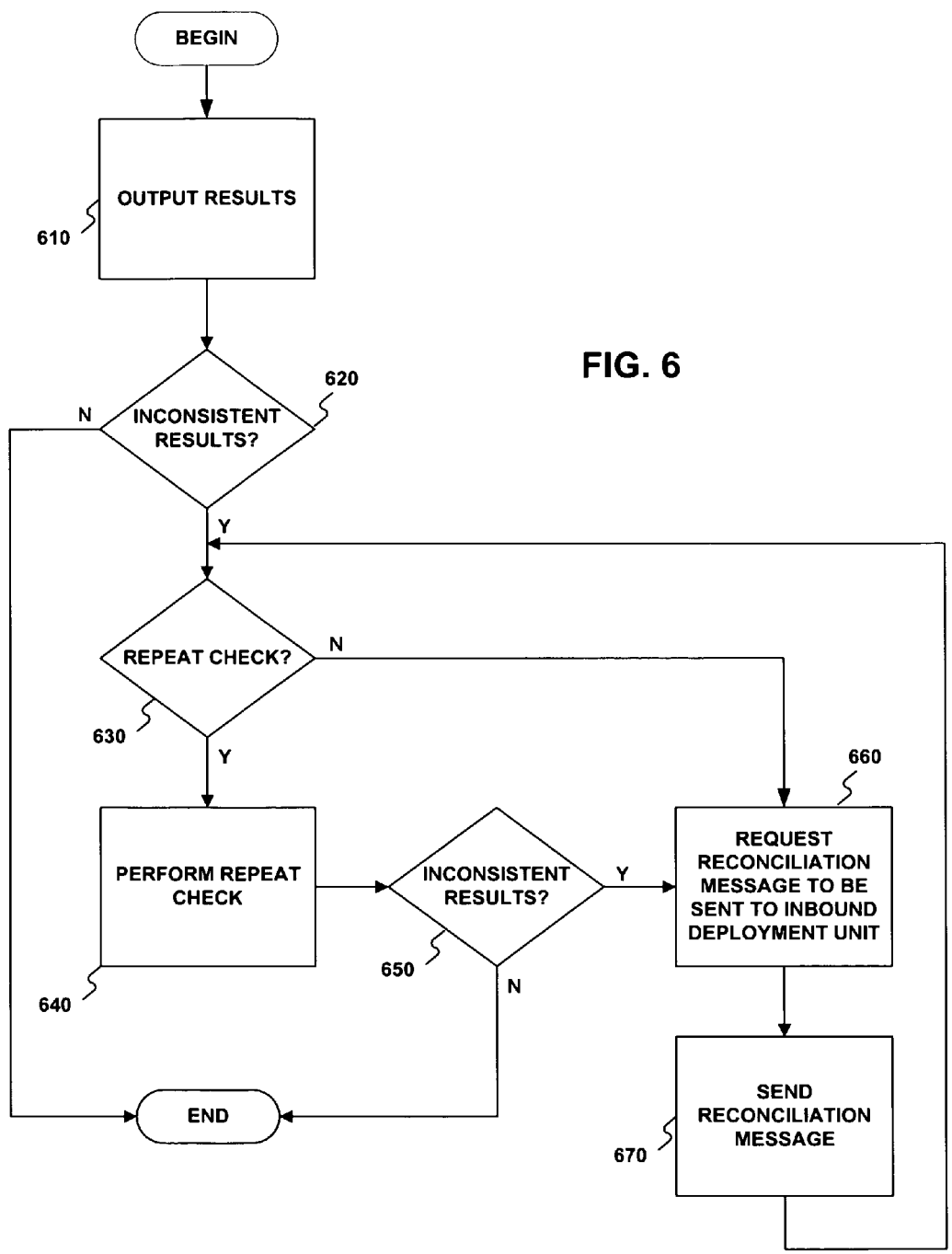
FIG. 6 illustrates an exemplary embodiment of a data reconciliation process consistent with the present invention.

FIG. 6 illustrates a first exemplary embodiment of the data reconciliation operations of FIG. 4 in more detail. The exemplary process of FIG. 6 may be used as part of a reconciliation or verification procedure to resolve any data inconsistencies. As shown in FIG. 6, a reconciliation procedure may begin with verification manager 150 outputting the results of comparison component 320 to a user (stage 610). If system 100 did not identify any data inconsistencies (stage 620; No), then there may be no need for any subsequent data reconciliation and thus the process may end. If, on the other hand, there is inconsistent data (stage 620; Yes), then verification manager 150 may determine whether a repeat check is necessary (stage 630). Persons of ordinary skill in the art will appreciate that verification manager 150 may determine whether to perform a repeat check automatically or may do so based upon an indication from a user to perform a repeat check. Moreover, system 100 may perform a repeat check at any time (such as before the process of FIG. 6 begins) or at multiple times.

Systems consistent with the invention may perform such a repeat check to, for example, eliminate temporary differences between the business objects. In other words, while an initial comparison operation may have detected differences, those differences may have subsequently been resolved or corrected by system 100. Thus, by performing a repeat check, system 100 may confirm that inconsistencies do exist. To this end, system 100 may prompt a user for selection of an optional repeat check.

If a repeat check is selected (stage 630; Yes), then verification manager 150 performs a repeat check (stage 640). The repeat check may, for example, be implemented by the exemplary process described above with respect to FIGS. 4 and 5. If a repeat check is not selected (stage 630; No), then the reconciliation procedure may proceed to processing operation 660 described below.

After performing a repeat check, verification manager 150 may then once again determine if any data inconsistencies exist (stage 650). If none do (stage 650; No), then the process may end. However, if inconsistencies still exist (stage 650; Yes), then reconciliation component 330 may request that outbound deployment unit 110 send one or more reconciliation messages to inbound deployment unit 120 (stage 660).

A reconciliation message is a message sent by an outbound deployment unit to an inbound deployment unit to update the data of the inbound deployment unit. Upon receiving the request, outbound deployment unit 110 may thus send the reconciliation message (stage 670). The reconciliation message may ensure that the business object 123 in the inbound deployment unit 120 is updated so that the data of both business objects 113 and 123 are consistent. To ensure the reconciliation message successfully updated the data of deployment unit 110, processing may return to stage 512, where verification manager 150 may determine whether to perform a repeat check of the reconciled business objects to verify that the reconciliation was successful.

Persons of ordinary skill in the art will note that the above described processing stages of FIG. 6 are entirely exemplary and that systems consistent with the invention may reconcile data inconsistencies using more or fewer of the stages shown in FIG. 6 or by implementing one or more of the stages of FIG. 6 in a different sequence.

Figure 7:
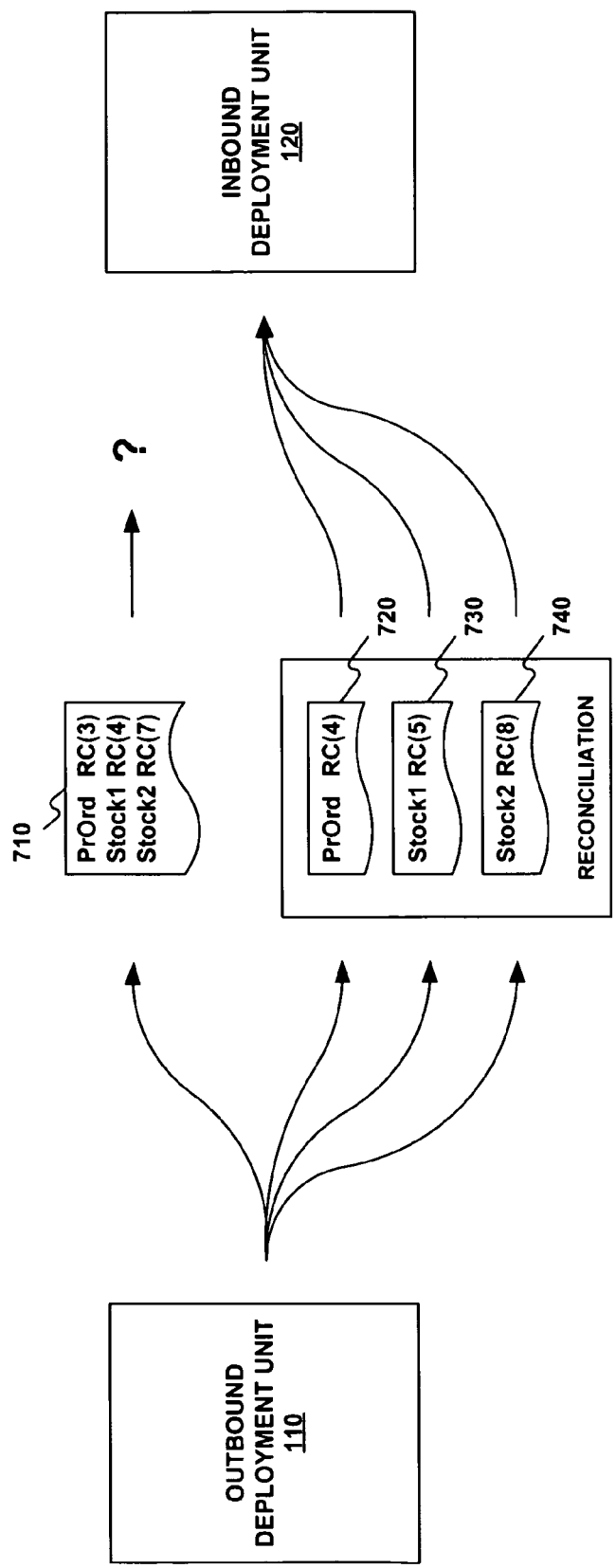
FIG. 7 is a conceptual diagram illustrating a data reconciliation process.

Further, in the exemplary embodiments described above, verification manager 150 may initiate a reconciliation message for each message sent by a deployment unit determined to have an inconsistency (e.g., when deployment unit 120 did not receive a message sent by deployment unit 110 or when the message sent was not correctly received). Further, verification manager 150 may determine whether to send a reconciliation message based on already sent reconciliation messages. For instance, as illustrated in FIG. 7, deployment unit 110 may attempt to send a message 710, but which deployment unit 120 does not correctly receive. As shown, message 710 may include business object data for PrOrd, Stock1, and Stock2. Further, in the example shown, system 100 has already sent reconciliation messages containing the individual business object data of message 710. A reconciliation count value is thus associated with each business object data of message 710. In particular, message 710 indicates that message 710 contains the third reconciliation RC(3) of PrOrd, the fourth reconciliation RC(4) of Stock1, and the seventh reconciliation RC(7) of Stock2. System 100 may use such reconciliation count values to determine that an inbound deployment unit processes the most recent version of sent business object data. More specifically, an inbound deployment unit may process only the business object data associated with a reconciliation count value higher than a count value associated with that business object sent in a previously received message.

Referring again to the example of FIG. 7, when message 710 is not received, verification manager 150 may then determine whether deployment unit 110 has already sent any reconciliation messages containing the business object data of message 710. In the illustration of FIG. 7, deployment unit 110 has sent three subsequent reconciliation messages 720, 730, and 740, each containing a segment of the business object data included in message 710. Because each is a subsequent reconciliation in this example, the reconciliation count value has been incremented by one. Deployment unit 120 may determine that messages 720, 730, 740 correspond to message 710 based on, for example, the relevant business object's name and root node values stored in PIP database 126. Accordingly, during reconciliation or comparison operation, verification manager 150 may determine that message 710 is obsolete due the successful transmission of messages 720, 730, and 740. Moreover, deployment unit 120 may confirm that messages 720, 730, and 740 are the most recent versions of the business object data based on the reconciliation count values.

Persons skilled in the art will understand that the various operations described above may be used as separate verification procedures or may be used together as part of an overall verification strategy. For example, the verification procedure of FIG. 5C may be used first to verify the accuracy of the processing performed by deployment unit 110, followed by the verification procedures of FIG. 5A. Other combinations will be apparent to those of ordinary skill in the art.

For purposes of explanation only, certain aspects and embodiments are described herein with reference to the components illustrated in FIGS. 1-7. The functionality of the illustrated components may overlap, however, and may be present in a fewer or greater number of elements and components. Further, all or part of the functionality of the illustrated elements may co-exist or be distributed among several geographically dispersed locations. Moreover, embodiments, features, aspects and principles of the present invention may be implemented in various environments and are not limited to the illustrated environments.

Further, the sequences of events described in FIGS. 1-7 are exemplary and not intended to be limiting. Thus, other method steps may be used, and even with the methods depicted in FIGS. 1-7, the particular order of events may vary without departing from the scope of the present invention. Moreover, certain steps may not be present and additional steps may be implemented in FIGS. 1-7. Also, the processes described herein are not inherently related to any particular apparatus and may be implemented by any suitable combination of components. For example, systems consistent with the invention may use automated or manual correction procedures other than those using a reconciliation message.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for verifying transfer of data in an application system, comprising:
    providing a computer processor;
    generating a first business object for use in a first part of the application system;
    generating a second business object, from the data included in the first business object, for use in a second part of the application system;
    accessing metadata defining content related to the first and second business objects; and
    verifying, by utilizing the computer processor, a transfer of data to the second part of the application system by verifying a consistency of data in the first and second business objects according to a comparison of the first and second business objects based on the accessed metadata.

2. The method of claim 1, wherein generating the first or second business object includes modifying an existing business object.

3. The method of claim 1, wherein generating the second business object further includes:
    copying the data of the first business object; and
    generating the second business object based on the copied data.

4. The method of claim 1, further including:
    storing, in a first persistent database, messaging data reflecting business objects included in one or more messages sent from the first part of the application system; and
    storing, in a second persistent database, messaging data reflecting business objects included in one or more messages received at the second part of the application system.

5. The method of claim 4, wherein verifying further includes:
    selecting the first and second business objects for verification of data consistency based on the messaging data stored in at least one of the first and second persistent databases.

6. The method of claim 5, wherein verifying further includes:
    filtering selected business objects based on the messaging data stored in at least one of the first and second persistent databases so that the verifying is performed for only those business objects associated with data transferred to the second part of the application system.

7. The method of claim 1, wherein verifying further includes:
    selecting the first and second business objects based on a determination that the fist and second business objects relate to a message sent during a predetermined time period.

8. The method of claim 1, wherein the metadata reflects structural data about parts of the first and second business objects that are relevant for at least one of selecting data in the first and second business objects to be compared or the comparison of the business objects.

9. The method of claim 8, wherein verifying further includes:
    determining, based on the metadata, corresponding data fields within the first and second business objects; and
    comparing the data of the corresponding data fields to verify the data is consistent.

10. The method of claim 9, wherein the comparing further includes:
    determining a checksum for each business object based on the corresponding data fields of each business object; and
    comparing the corresponding data fields based on the determined checksums.

11. The method of claim 1, wherein verifying further includes:
    determining a reconciliation procedure to perform based on the accessed metadata, wherein the reconciliation procedure reconciles a data inconsistency between the first and second business objects.

12. The method of claim 11, wherein determining the reconciliation procedure further includes:
    determining to perform a repeat check of the first and second business objects based on the accessed metadata.

13. The method of claim 1, wherein verifying further includes:
    performing a reconciliation procedure, when the comparison identifies inconsistent data between the first and second business objects, to make data of the first and second business objects consistent.

14. The method of claim 13, wherein the reconciliation procedure further includes:
    sending a reconciliation message from the first processing component to the second processing component, wherein the reconciliation message includes the data identified as inconsistent.

15. The method of claim 1, wherein the metadata reflects structural data about parts of the first and second business objects and wherein the verifying further includes:
    determining, based on the metadata, corresponding data fields within the first and second business objects to be compared.

16. A computer-implemented system for verifying transfer of data in an application system, comprising:
    providing a computer processor;
    a first processing component for sending a message including data of a first business object for use in a first part of the application system;
    a second processing component for receiving the sent message and for generating a second business object, based on the data related to the sent message, for use in a second part of the application system; and
    a verification module for accessing metadata defining content related to the first and second business objects and verifying, by utilizing the computer processor, a transfer of the message sent to the second part of the application system by verifying consistency of data in the first and second business objects by comparing the first and second business objects based on the accessed metadata.

17. The system of claim 16, further including:
    a persistent database for storing messaging data reflecting sent or received business objects included in one or more messages; and
    wherein the verification module filters selected business objects for verification based on the messaging data stored in the persistent database so that the verifying is performed for only those business objects associated with data transferred to the second part of the application system.

18. The system of claim 16, wherein the metadata reflects structural data about the first and second business objects that are relevant for at least one of selecting data in the first and second business objects to be compared or the comparison of the business objects.

19. The system of claim 18, wherein the verification module:
- determines, based on the metadata, corresponding data fields within the first and second business objects,
- determines a checksum for each business object based on the corresponding data fields of each business object, and
- compares the corresponding data fields based on the determined checksums.

20. The system of claim 16, wherein the verification module further includes:
- a first verification component associated with the first processing component and for accessing the metadata defining content related to the first business object;
- a second verification component associated with the second processing component and for accessing the metadata defining content related to the second business objects; and
- wherein at least one of the first or second verification components compares the first and second business objects based on the accessed metadata.

21. The system of claim 16, wherein the verification module further includes:
- a reconciliation module for reconciling data of the first and second business objects consistent when the comparison identifies inconsistent data between the first and second business objects.

22. A computer-implemented system for verifying data of an application system, comprising:
- a computer processor;
- means for generating a first business object for use in a first part of the application system;
- means for generating a second business object, from the data related to the first business object, for use in a second part of the application system;
- means for accessing metadata defining content related to the first and second business objects; and
- means for verifying, by utilizing the computer processor, a transfer of data to the second part of the application system by verifying a consistency of data in the first and second business objects according to a comparison of the first and second business objects based on the accessed metadata.

* * * * *